United States Patent [19]

Aiken et al.

[11] 4,248,832

[45] Feb. 3, 1981

[54] WASTE GAS PURIFICATION REACTOR INCLUDING PACKING HOLDER AND CATALYST LEVELER SUPPORT

[75] Inventors: John E. Aiken, Monroeville Boro; William J. Didycz, Whitehall Boro; Stanley J. Kerkentzes, Lower Burrell, all of Pa.

[73] Assignee: United States Steel Corporation, Pittsburgh, Pa.

[21] Appl. No.: 47,410

[22] Filed: Jun. 11, 1979

[51] Int. Cl.³ .................. B01J 19/24; B01J 23/64; B01J 23/84

[52] U.S. Cl. ................................ 422/177; 422/191; 422/211

[58] Field of Search ............... 422/173, 177, 190, 191, 422/193, 211, 170, 171

[56] References Cited

U.S. PATENT DOCUMENTS

| | | | |
|---|---|---|---|
| 3,259,453 | 7/1966 | Stiles | 422/177 X |
| 3,466,151 | 9/1969 | Sicard et al. | 422/191 |
| 3,477,825 | 11/1969 | Lannert et al. | 422/211 |
| 3,489,529 | 1/1970 | Dudych et al. | 422/191 |
| 4,090,852 | 5/1978 | Dowd | 422/177 X |

Primary Examiner—William A. Cuchlinski, Jr.
Attorney, Agent, or Firm—W. Gary Goodson

[57] ABSTRACT

Reactor for removing oxidizable pollutants from a waste gas stream which comprises (1) means for introducing the waste gas stream through an inlet into a chamber containing a substantially horizontal catalyst bed container means below the inlet, which container means is for containing a granular catalyst bed for oxidizing the pollutants and which container means comprises (a) support means for the catalyst bed which support means is permeable to the waste gas stream and covers substantially the entire horizontal cross section area of the chamber below the catalyst bed and has an outer edge adjacent to the chamber wall, (b) packing means to fit around the outer edge of the support means to prevent loss of catalyst between the edge of the support means and the wall of the chamber, (c) ledge means which provides a substantially horizontal support around the inside periphery of the chamber wall for leveling the catalyst bed and which ledge means also exerts substantial downward and outward pressure on the packing means to thereby tightly press the packing means against the support means and the wall of the chamber, (2) means for passing the waste gas stream through the catalyst bed while maintaining the catalyst bed at a temperature of between about 140° C. and about 540° C. and sufficient to sustain catalytic oxidation of the oxidizable pollutants; and (3) means for withdrawing through an outlet of the chamber the waste gas stream which has passed through the catalyst bed.

11 Claims, 3 Drawing Figures

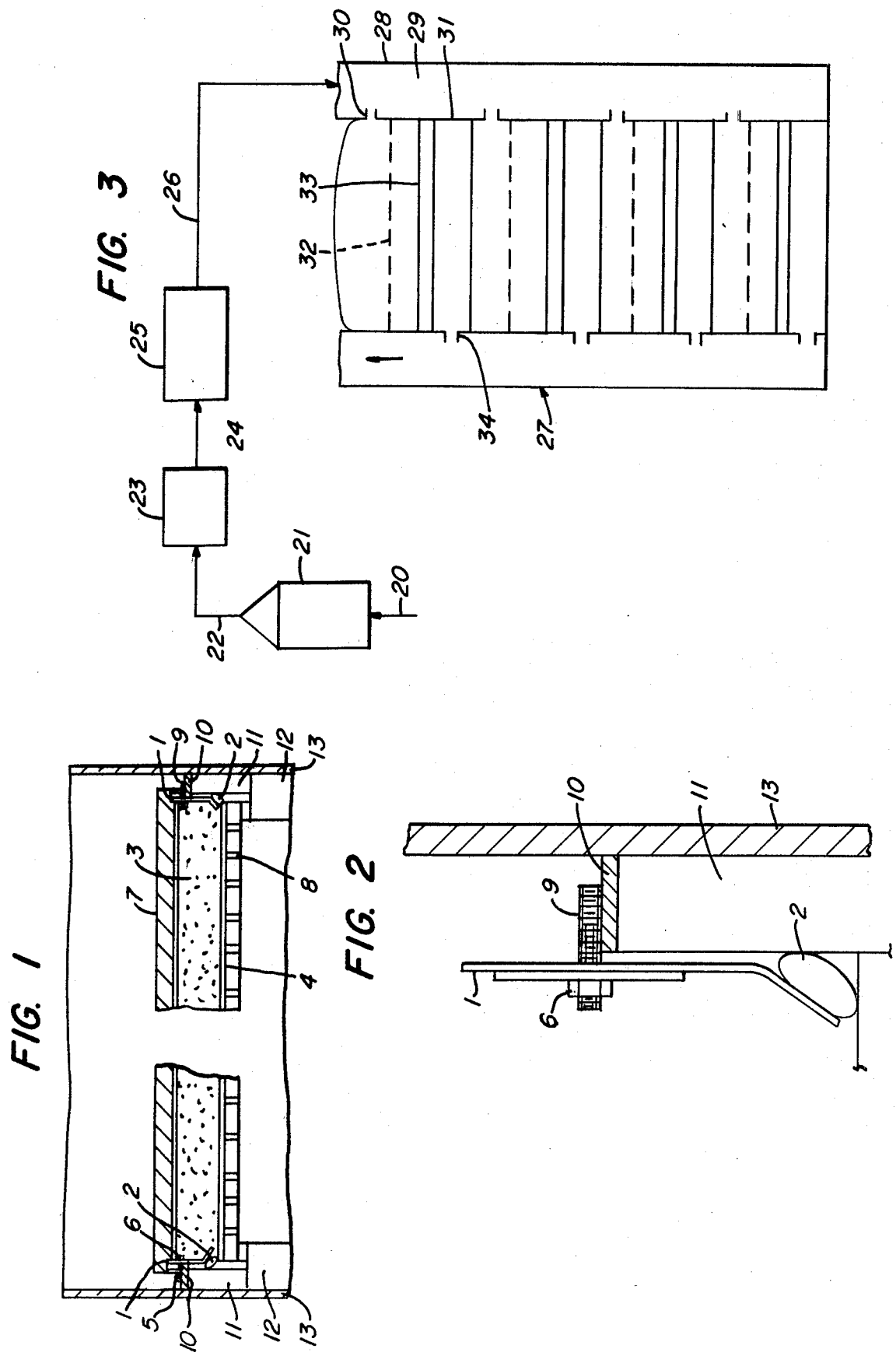

WASTE GAS PURIFICATION REACTOR INCLUDING PACKING HOLDER AND CATALYST LEVELER SUPPORT

BACKGROUND OF THE INVENTION

1. Field of the Invention

This invention relates to air pollution control. More specifically, the invention is directed to a reactor and method for insuring oxidation of oxidizable materials in waste gas streams, and particularly by means of a waste gas purifier such as a catalytic oxidation unit. More particularly, the invention relates to a reactor and method whereby a catalyst bed of substantially uniform thickness is maintained by means of a combined leveling and packing holder.

2. Description of the Prior Art

Considerable effort has gone into removing harmful materials present in waste gas streams such as would be present in industrial plants such as those waste gases produced in the production of maleic anhydride. In developing waste gas purification units for such waste gas streams, one problem that arises is the low percent oxidation of the oxidizable components of the waste gas streams. This is particularly true in catalyst systems where it is necessary to make the catalyst beds relatively thin, such as from about 1 to 8 inches in depth, in order to prevent catalyst attrition and due to the high cost of the catalyst. Also, in some of these catalyst beds, such as those composed of oxides of manganese and copper, in order to prevent overheating of the catalyst and to minimize the energy needed to preheat, the waste gas is preheated only to the temperature needed to oxidize one of the contaminants, e.g. carbon monoxide (CO). The heat released by oxidation of the CO heats the gas to the ignition temperature of the other contaminants—hydrocarbons. Thus, the portion of the catalyst bed able to completely oxidize the hydrocarbons is small, which means that only a very thin layer of the catalyst bed is useful for conversion of hydrocarbons. If the catalyst bed thickness is not substantially uniform, the CO conversion will tend to decrease in thin areas and therefore provide less heating of the gas. The lower gas temperature in turn will diminish or perhaps prevent the oxidation of hydrocarbon pollutants.

This problem of non-uniform thickness of catalyst beds manifests itself in two ways. First, since the support screens for the catalyst bed are removable for ease of cleaning the screens and changing the catalyst, granules of the catalyst bed are lost over the edge of the catalyst support. Second, there is a problem of getting the catalyst bed level initially.

An example of the problem was demonstrated when in the construction of a catalytic oxidation unit it was discovered that, even with the close tolerances specified, gaps existed between the catalyst support screen, castable refractory sidewalls, and screen support gridwork. These gaps would have provided a path by which the small granules of catalyst could pass through thereby becoming lost from the catalyst bed rendering the bed ineffective. Also, because of distortions in the screens, grids and refractory, the desired spacing between the screen and the top of the refractory was unequal and outside the specified limits, thereby making it impossible to obtain the desired thickness of catalyst bed. Also, closer tolerances could not be specified because of necessary allowances for differential thermal expansion of the screen, vessel wall, grid and refractory.

SUMMARY OF THE INVENTION

The reactor and method of this invention which overcome the above discussed and numerous other disadvantages and deficiencies of the prior relate to a reactor for a waste gas stream containing oxidizable pollutants comprising:

(1) means for introducing the waste gas stream through an inlet into a chamber containing a substantially horizontal catalyst bed container means below the inlet, which container means is for containing a granular catalyst bed for oxidizing the pollutants and which container means comprises (a) support means for the catalyst bed which support means is permeable to the waste gas stream and covers substantially the entire horizontal cross section area of the chamber below the catalyst bed and has an outer edge adjacent to the chamber wall, (b) packing means to fit around the outer edge of the support means to prevent loss of catalyst between the edge of the support means and the wall of the chamber, (c) ledge means which provides a substantially horizontal support around the inside periphery of the chamber wall for leveling the catalyst bed and which ledge means also exerts substantial downward and outward pressure on the packing means to thereby tightly press the packing means against the support means and the wall of the chamber, (2) means for passing the waste gas stream through the catalyst bed while maintaining the catalyst bed at a temperature between about 140° C. and about 540° C. and sufficient to sustain catalytic oxidation of the oxidizable pollutants; and (3) means for withdrawing through an outlet of the chamber the waste gas stream which has passed through the catalyst bed.

The invention described effectively eliminates the problem of non-uniform thickness of the catalyst bed by effectively and simply providing means for leveling the catalyst bed initially and then preventing escape of catalyst granules around the outer edge of the support for the catalyst bed.

BRIEF DESCRIPTION OF THE DRAWINGS

This invention may be better understood and its numerous objects and advantages will become apparent to those skilled in the art by reference to the accompanying drawings as follows:

FIG. 1 is a schematic representation of the device including packing holder and catalyst leveler support in combination with a catalyst bed.

FIG. 2 is a schematic representation of an enlarged view of the device including packing holder and catalyst leveler support.

FIG. 3 is a schematic representation of a preferred waste gas purification reactor and method including a plurality of catalyst beds and corresponding distributor plates.

DESCRIPTION OF THE PREFERRED EMBODIMENTS

The ledge means is preferably in the form of a strip, and most preferably in the form of a cylinder, which extends around the periphery of the chamber containing the catalyst bed. Preferably, the strip is substantially parallel to the vertical chamber wall, except at the bottom where it is inclined inward to facilitate holding the packing against the outer edge of the catalyst support and the chamber wall. It will be understood that the term "catalyst wall" includes refractory liners, support strips and the like which are attached to the basic wall for various reasons. This is more clearly understood by reference to FIGS. 1 and 2.

In its preferred embodiment the ledge means is adjustable in height in order to be able to vary the height of the catalyst bed as desired.

The support means for the catalyst bed is preferably made up of a screen that allows passage of the gases through with essentially no pressure drop, but that prevents the catalyst granules from passing through. This screen is preferably supported by a catalyst grid which in turn may be supported by a ledge which is fastened to the chamber wall.

The packing means is preferably a soft, yielding material which will withstand the temperatures of the process. Asbestos rope is especially preferred.

The waste gas stream containing the entrained liquid droplets is preferably heated to a temperature between about 50° and about 200° C. More preferably, this range is between about 60° and about 160° C. In a preferred embodiment, during start-up of the catalytic oxidation unit, the thin fin heat exchanger heats the waste gas stream up to about 160° C. After start-up, a second heat exchanger using the heat from the catalytic oxidation unit starts working. Therefore, the thin fin heat exchanger only has to heat the waste gas stream to about 60°–70° C., and the supplementary heat exchanger heats the waste gas stream the rest of the way up to 160° C.

The waste gas stream of this invention may be any of those containing impurities which may be removed by a waste gas catalytic oxidation unit. However, the invention is particularly directed to those waste gas streams containing oxidizable pollutants such as hydrocarbons and carbon monoxide. Exemplary hydrocarbons found in the preferred waste gas streams are benzene, maleic acid, formic acid, and formaldehyde. One exemplary waste gas stream contains the following amounts of impurities in pounds per hour per 200,000 pounds per hour of waste gas: benzene-117, maleic acid-21, formic acid-17, formaldehyde-75, and carbon monoxide-3340.

In general, the class of pollutants may be those selected from the group $C_1$–$C_{12}$ aliphatic and aromatic hydrocarbons and partially oxygenated $C_1$–$C_{12}$ aliphatic and aromatic hydrocarbons.

A preferred waste gas stream comprises nitrogen, oxygen, carbon monoxide, carbon dioxide, and water vapor, and most preferably one wherein the nitrogen is present in said waste gas stream in an amount between about 76 and about 80 percent by volume, the oxygen is present in an amount between about 10 and about 15 percent by volume, the water vapor is present in an amount between about 5 and about 15 percent by volume, the carbon monoxide is present in an amount between about 1 and about 3 percent by volume, and the carbon dioxide is present in an amount between about 2 and about 8 percent by volume.

The waste gas purification unit of this invention is preferably a catalytic oxidation unit, and more preferably, one wherein the catalyst comprises oxides of manganese and copper. An especially preferred catalyst is a hopcalite catalyst. It is important to maintain temperature of the catalyst during use between about 120° C. and about 600° C., and preferably between about 125° C. and about 540° C. The temperature rise from the inlet to the outlet sides of the catalyst bed is preferably between about 150° C. and about 300° C.

The catalyst bed is preferably made up of catalyst granules and has a thickness of between about 1 to 8 inches and more preferably between about 3 to 8 inches. The catalyst granules preferably have an average diameter of between about 1 and about 4 millimeters. The term granule includes pellets, particles and the like. The pressure drop from the inlet to the outlet of the catalyst bed may be between about 1 inch to about 10 inches of water; and the combined pressure drop over the distributor plate and the catalyst bed will generally be between about 2 inches and about 11 inches.

The preferred distance between the outlet side of the distributor plate and the inlet side of the catalyst bed is between about 18 inches and about 5 feet.

The velocity of the waste gas stream at the face of the catalyst bed is preferably between about 60 and about 140 feet per minute.

In FIG. 1 circumferential strip (ledge means) 1 presses downward on packing 2 which causes the packing to seal off the potential catalyst leakage path by pressing against the outer edge of screen 4 and circumferential support 11. Also by design, the strip is sized to provide for a given maximum thickness of catalyst bed 3 supported by screen 4 upheld by screen support grid 8. Slots 5 in strip 1 allow for correct positioning. After correct positioning, nuts 6 are tightened rendering strips 1 immobile. Desired catalyst height is obtained by dragging leveler 7 across the top surface of the catalyst and adding or removing catalyst as desired. Fastening means 9, such as a nut and stud which is tack welded to ring 10, holds the circumferential strip 1 firmly against circumferential ring 10 and circumferential support 11. Ring 10 is preferably made of metal which is preferably tack welded to chamber wall 13. Support 11 is preferably a refractory such as castable insulation which helps maintain a uniform temperature. Support 11 preferably rests upon support 12 which in turn is permanently attached, as by welding, to oxidizer chamber wall 13. Support 11, ring 10 and support 12 essentially form part of chamber wall 13, as the term is used herein.

In FIG. 2 is a more detailed view of circumferential strip 1 (⅛ inch×6 inches) of FIG. 1 showing a preferred way of fastening it to chamber wall 13 by means of circumferential ring 10. Also shown is how circumferential strip 1 brings pressure on packing 2, preferably in the form of a soft material such as asbestos rope to prevent catalyst granules from escaping from the edge of the catalyst bed.

FIG. 3 represents a preferred embodiment of the invention wherein a waste gas stream at entrance 20 containing maleic anhydride vapor and other oxidizable pollutants enters scrubber 21 where the waste gas stream is contacted with scrubbing liquid to remove the organic vapor, but leaving minor amounts of the organics dissolved in droplets of the scrubbing liquid suspended in the waste gas stream. The waste gas stream then passes through line 22 to device 23 for contacting the waste gas stream with a plurality of closely spaced thin fin heating elements to heat the scrubbed gas stream until the scrubbing liquid evaporates from the droplets and deposits the dissolved solids on the plurality of thin fin heating elements. The heated waste gas stream free of entrained droplets and dissolved solids then passes through line 24 to extra heat exchanger 25 which preferably obtains its heat from catalytic oxidation unit 27 after such unit has started up. The preheated gas stream from 25 leaves through line 26 and passes into catalytic oxidation unit 27 which comprises a plurality of horizontal, parallel catalyst beds with corresponding distributor plates. The outer reactor wall 28 helps provide means 29 for allowing the waste gas stream to communicate with different inlets 30 of the chambers 31 containing distributor plates 32 and corresponding catalyst beds 33. Catalyst beds 33 are in the form of FIG. 1, although the detail is not shown in this FIG. 3. The waste gas stream containing the oxidizable impurities enters the catalytic oxidation unit 27 through inlet 30 of chamber 31. The gas stream then passes through distributor plate 32 where it undergoes a pressure drop sufficient to cause the gas stream to be substantially uniformly distributed over the catalyst bed, and wherein the distributor plate openings create in the plate surface a total open area of less then about 10 percent. The gas stream then passes through catalyst bed 33 and then leaves through outlet 34.

We claim:

1. Apparatus for removing oxidizable pollutants from a waste gas stream which comprises:
   (1) means for introducing said waste gas stream through an inlet into a chamber containing a substantially horizontal catalyst bed container means below said inlet which container means is for containing a granular catalyst bed for oxidizing said pollutants and which container means comprises:
      (a) support means for said catalyst bed which support means is permeable to said waste gas stream and covers substantially the entire horizontal cross sectional area of said chamber below said catalyst bed and has an outer edge adjacent to the chamber wall,
      (b) packing means to fit around the outer edge of said support means to prevent loss of catalyst between the edge of said support means and the wall of said chamber,
      (c) ledge means which provides a substantially horizontal support around the inside periphery of said chamber wall for leveling said catalyst bed and which ledge means also exerts substantial downward and outward pressure on said packing means to thereby tightly press said packing means against said support means and the wall of said chamber;
   (2) means for passing said waste gas stream through said catalyst bed while maintaining said catalyst bed at a temperature of between about 140° and about 540° C. and sufficient to sustain catalytic oxidation of said oxidizable pollutants; and
   (3) means for withdrawing through an outlet of said chamber said waste gas stream which has passed through said catalyst bed.

2. Apparatus as in claim 1 wherein said ledge means is in the form of a strip which is substantially parallel to the chamber wall and which extends around the periphery of the chamber.

3. Apparatus as in claim 2 wherein said strip of said ledge means is inclined inward at the bottom of said strip to facilitate holding said packing means against the outer edge of said support means and the wall of said chamber.

4. Apparatus as in claim 3 wherein said wall of said chamber includes a refractory liner.

5. Reactor for treating a waste gas stream containing oxidizable pollutants comprising benzene, maleic acid, formic acid, formaldehyde, carbon monoxide, or mixtures thereof, and which reactor comprises:
   (1) an inlet into a chamber containing a substantially horizontal catalyst bed for oxidizing said pollutants;
   (2) substantially horizontal, thin, granular catalyst bed of substantially uniform thickness;
   (3) support means for said catalyst bed which support means is permeable to said waste gas stream and covers substantially the entire horizontal cross sectional area of said chamber below said catalyst bed;
   (4) packing means to fit around the upper edge of said support means to prevent loss of catalyst between the edge of said support means and the wall of said chamber;
   (5) ledge means which provides a substantially horizontal support around the inside periphery of said chamber for leveling said catalyst bed and which ledge means also exerts substantial downward and outward pressure on said packing to thereby tightly press said packing means against said support means and the wall of said chamber, and
   (6) outlet means for withdrawing said waste gas stream which has passed through said catalyst bed from said chamber.

6. Reactor as in claim 5 wherein said ledge means is in the form of a strip which is substantially parallel to the chamber wall and which extends around the periphery of the chamber.

7. Reactor as in claim 6 wherein said strip of said ledge means is inclined inward at the bottom of said strip to facilitate holding said packing means against the outer edge of said support means and the wall of said chamber.

8. Apparatus as in claim 7 wherein said wall of said chamber includes a refractory liner.

9. Reactor as in claim 5 wherein said catalyst bed has a thickness of between about 1 and about 8 inches.

10. Reactor as in claim 9 wherein said catalyst bed comprises granules having an average diameter of between about 1 and about 4 millimeters.

11. Reactor as in claim 10 wherein said packing means is asbestos rope and wherein said catalyst granules comprise oxides of manganese and copper.

* * * * *